United States Patent [19]

Hass

[11] Patent Number: 4,597,954

[45] Date of Patent: * Jul. 1, 1986

[54] PROCESS FOR REMOVING SOX AND NOX COMPOUNDS FROM GAS STREAMS

[75] Inventor: Robert H. Hass, Fullerton, Calif.

[73] Assignee: Union Oil Company of California, Los Angeles, Calif.

[*] Notice: The portion of the term of this patent subsequent to Sep. 16, 1997 has been disclaimed.

[21] Appl. No.: 427,958

[22] Filed: Sep. 29, 1982

Related U.S. Application Data

[60] Division of Ser. No. 151,783, May 21, 1980, Pat. No. 4,372,932, Continuation-in-part of Ser. No. 907,189, May 18, 1978, Pat. No. 4,222,991.

[51] Int. Cl.$^4$ .................... C01B 21/00; C01B 17/00; C02F 1/70
[52] U.S. Cl. .................. 423/138; 423/235; 423/243; 423/239; 210/757; 556/148
[58] Field of Search ............. 423/243, 242, 235, 567, 423/567 A, 569, 351; 252/184, 191, 188.3 R; 210/24, 37, 757, 903; 260/429 J

[56] References Cited

U.S. PATENT DOCUMENTS

| | | | |
|---|---|---|---|
| 2,142,987 | 1/1939 | Bacon et al. | 423/243 |
| 2,664,441 | 12/1953 | Owens et al. | 210/37 A |
| 2,697,725 | 12/1954 | Bryce | 210/37 A |
| 2,729,543 | 1/1956 | Keller | 423/243 |
| 3,397,963 | 8/1968 | Wagner | 423/569 |
| 3,584,042 | 6/1971 | Yavorsky et al. | 260/542 |
| 3,592,850 | 7/1971 | Mazzocco et al. | 210/542 |
| 3,687,614 | 8/1972 | Yavorsky et al. | 423/243 |
| 3,687,615 | 8/1972 | Gorin et al. | 423/243 |
| 3,928,537 | 12/1975 | Saitoh et al. | 423/235 |
| 3,961,034 | 6/1976 | Bostian et al. | 210/37 R |
| 3,984,522 | 10/1976 | Saito et al. | 423/235 |
| 4,013,430 | 3/1977 | Adachi et al. | 423/235 |
| 4,055,623 | 10/1977 | Saitoh et al. | 423/235 |
| 4,071,602 | 1/1978 | Pearce | 423/235 |
| 4,083,944 | 4/1978 | Chalmers | 423/567 A |
| 4,177,140 | 12/1979 | Smakman | 210/683 |
| 4,222,991 | 9/1980 | Hass | 423/235 |
| 4,331,639 | 5/1982 | Hass et al. | 423/235 |
| 4,347,227 | 8/1982 | Hass et al. | 423/235 |
| 4,386,058 | 5/1983 | Hass | 423/243 |

FOREIGN PATENT DOCUMENTS

| | | | |
|---|---|---|---|
| 2350962 | 4/1974 | Fed. Rep. of Germany | 210/903 |
| 50-18348 | 2/1975 | Japan | 423/235 |
| 51-109280 | 9/1976 | Japan | 423/235 |
| 52-18468 | 2/1977 | Japan | |
| 53-32795 | 9/1978 | Japan | |

OTHER PUBLICATIONS

"Reactions with Addition Compounds Containing Activated Formic Acid", published in Augwandte Chemie, International Edition in English, Wagner, vol. 9, 1970, pp. 50-54.

"Nox Abatement for Stationary Sources in Japan," Environmental Protection Agency, Sep., 1977, EPA-600/7-77-103b.

"Potassium Formate Process for Removing $So_2$ from Stack Gas" in Environmental Science and Technology, vol. 4, No. 9, Sep. 1970, pp. 757-765.

(List continued on next page.)

*Primary Examiner*—Gary P. Straub
*Attorney, Agent, or Firm*—Gregory F. Wirzbicki; Dean Sandford

[57] ABSTRACT

A process for removing $SO_x$ pollutants from a stack gas by (1) absorbing the $SO_x$ pollutants into an aqueous absorbent containing a formate compound and (2) regenerating the spent absorbent containing dissolved $SO_x$ compounds by contact, in the presence of added formate anion, with a water-insoluble, solid substance containing one or more tertiary amine functional groups. Nitrogen monoxide is removed by providing in the aqueous absorbent an iron(II) chelate, such as a chelate of ferrous ion with ethylenediaminetetraacetic acid. Regeneration of the spent absorbent containing absorbed NO is accomplished under the same conditions as for spent absorbents containing absorbed $SO_x$ compounds. $SO_x$ and NO pollutants dissolved in the absorbent are, during regeneration, converted to hydrogen sulfide and nitrogen, respectively.

23 Claims, 2 Drawing Figures

OTHER PUBLICATIONS

"Amber-Hi-Lites," Special Issue, Jan. 1971, Rohm and Haas Co., Philadelphia, Pa., 7 pages.

"Amberlite IRA-47" by Rohm and Haas Co., May 1970.

"Amber-Hi-Lites" by Rohm and Haas Co., Special Issue, No. 159, Aug. 1978.

"Microdetermination of Nitrates and Nitrites-III" by Awad et al. in Talanta, vol. 18, No. 7 (1977) pp. 219-224.

"Absorption of Nitric Oxide by Ferrous Sulfate" by Ganz et al. in the Journal of Applied Chemistry of the U.S.S.R., vol. 26, No. 10, (Oct., 1953), pp. 927-935—English translation.

Abstract of a publication entitled "Fixed Bed Sorption of Sulfur Dioxide by Ion Exchange Resins" by R. W. Thompson et al., 69th AiChE Annual Meeting, Chicago, 11/28-12/2/76, Preprint No. 71d).

Chemical Abstract, vol. 85, 112310n German Offen No. 2,444,781.

Chemical Abstract, vol. 86, 95324w German Offen No. 2,509,788.

Chemical Abstract, vol. 86, 126476d German Offen No. 2,511,140.

Chemical Abstract, vol. 86, 176561y German Offen No. 2,519,939.

Chemical Abstract, vol. 87, 90011c German Offen No. 2,538,312.

CONVERSION OF DISSOLVED $SO_2$ TO $H_2S$ AND $S$ OVER AMBERLYST A-21 AS A FUNCTION OF RECIPROCAL REGENERATOR TEMPERATURE.

PROCESS FOR REMOVING SOX AND NOX COMPOUNDS FROM GAS STREAMS

CROSS-REFERENCE TO RELATED APPLICATIONS

This patent application is a division of copending U.S. patent application Ser. No. 151,783 filed May 21, 1980, now U.S. Pat. No. 4,372,932, which is itself a continuation in part of copending application Ser. No. 907,189 filed May 18, 1978, now U.S. Pat. No. 4,222,991.

BACKGROUND OF THE INVENTION

This invention relates to the removal of $SO_x$ and $NO_x$ compounds from waste gas streams. More particularly, the invention relates to the removal of $SO_2$, $SO_3$, NO, and $NO_2$ from industrial stack gases.

The burning of coal or oil as fuel in a boiler or furnace produces a flue gas (or stack gas) usually containing $SO_2$, $SO_3$, and $NO_x$. The concentration of these components in a particular stack gas depends upon such factors as the concentration of sulfur and nitrogen components in the fuel, the metals concentration in the fuel, the air rate fed to the boiler or furnace, and the temperature of combustion. A stack gas, however, will usually contain between about 10 and 2000 ppmv $NO_x$ and about 100 ppmv and 5 mole percent $SO_x$ compounds, with the large majority of the latter, usually at least about 95% thereof, being in the form of $SO_2$.

Before a stack gas containing $SO_x$ compounds may be discharged to the atmosphere, many environmental regulatory agencies require that the stack gas be desulfurized, that is, that the concentration of sulfur compounds therein be reduced to specified levels. Similar regulations require the removal of $NO_x$ components in stack gas, largely for the reason that such components contribute to photochemical smog.

The most conventional method presently utilized to remove $SO_x$ compounds from a stack gas involves contacting the stack gas with a liquid absorbent containing dissolved lime or caustic. But although such a process is favorable from a cost standpoint, it is largely ineffective for removing NO, which might also be present in the stack gas. In addition, since the spent absorbent obtained from a lime or caustic treatment is regenerable only by extremely costly techniques, the spent absorbent is usually not regenerated; instead, it is allowed to accumulate for waste disposal, which requires in many instances the daily handling of tons of spent absorbent. Thus, waste disposal of spent absorbent is a nuisance at the least and oftentimes a very difficult task.

Accordingly, it is an object of this invention to provide a process for removing $SO_x$ from a gas stream while minimizing the amount of waste products produced. It is a further object to provide a process for (1) simultaneously and effectively removing both $SO_x$ and $NO_x$ components from a gas stream by absorption in an aqueous liquid and (2) easily regenerating the aqueous liquid when laden with dissolved $SO_x$ and $NO_x$ compounds such that said $SO_x$ and $NO_x$ compounds are converted to hydrogen sulfide and nitrogen. Other objects and advantages of the invention will be apparent in view of the following description of the invention.

SUMMARY OF THE INVENTION

According to this invention, $SO_x$ compounds present in stack gases and other feed gases are removed therefrom by contact with an absorbent comprising an aqueous solution of one or more formate compounds. The process is most successfully accomplished in an absorption zone into which the feed gas and fresh (or regenerated) absorbent are introduced and from which a desulfurized product gas and spent absorbent are continuously removed.

Provision is also made in the invention for regenerating the spent absorbent to a form once again active for removing $SO_x$ compounds. This is accomplished by contacting the spent absorbent, in the presence of added formate ion, and under conditions of elevated temperature and pressure, with a water-insoluble, solid substance containing a tertiary amine functional group. Such contacting results in the regeneration of the absorbent by converting a substantial proportion of the dissolved sulfur constituents to hydrogen sulfide, which hydrogen sulfide is removed with other gases from the regenerated, aqueous absorbent by separation in either the regeneration zone itself or in a suitable gas-liquid separator. Once separated from non-condensable gases, the regenerated absorbent is in a condition for recycle to the absorption zone.

In one alternative embodiment of the invention, a water-soluble iron(II) chelate is introduced into the absorbent for the purpose of absorbing NO which might also be present along with the $SO_x$ compounds in the feed gas stream. In such embodiment, regeneration of the spent absorbent in the manner hereinbefore described results in the absorbent becoming active for the absorption of both $SO_x$ and NO compounds.

In yet another embodiment of the invention, wherein the stack gas is free of $SO_x$ compounds but contains NO, as might be the case if the stack gas consists of the gases produced by combusting a desulfurized fossil fuel, the NO itself may be removed by contact in an absorption zone with an aqueous solution containing a dissolved iron(II) chelate. Regeneration of the absorbent is accomplished in the same manner as above described, that is, by contact in the presence of added formate ion with a water insoluble, solid substance containing one or more tertiary amine functional groups.

As used herein, the term absorbent refers to the aqueous medium used in the process to remove $SO_x$ and/or $NO_x$ from the feed gas, regardless of the particular mechanism by which the $SO_x$ and $NO_x$ components are removed from the feed gas and retained by the absorbent. Also, reference to $SO_x$ is meant to include $SO_2$ and $SO_3$ while reference to $NO_x$ is meant to include NO and $NO_2$.

DETAILED DESCRIPTION OF THE INVENTION

Figure 1:
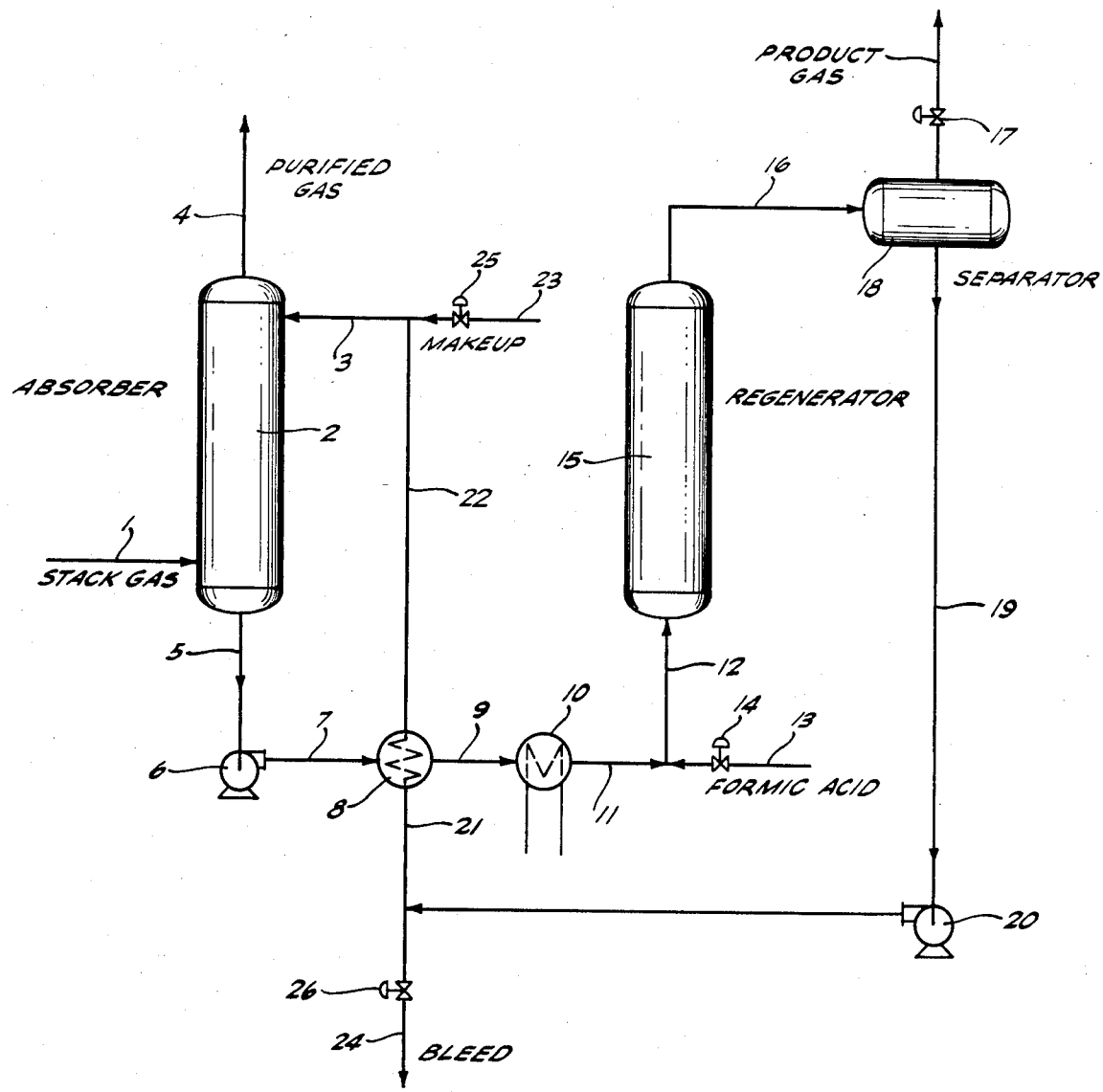
FIG. 1 of the drawing is a schematic flowsheet of the preferred embodiment of the invention for removing $SO_x$ and $NO_x$ pollutants from a feed gas. For simplicity, devices such as pressure relief valves, back pressure regulators, and other conventional equipment have not been represented in the drawing.

The gas streams suitable for treatment in the process of this invention are those gas streams containing $SO_x$ and/or $NO_x$ compounds. Preferred gas streams for treatment herein contain at least some $SO_x$ compounds, most preferably in concentrations exceeding 500 ppmv, with a substantial proportion, usually above 95%, of the $SO_x$ components consisting of $SO_2$. Such gas streams include waste gas streams, such as a Claus tail gas stream that has been subjected to oxidation so as to contain $SO_2$ as the major sulfur component. Also included are waste gases produced by roasting sulfided ores. The preferred waste gas stream, however, is a particulate-free stack gas containing $SO_2$ and $SO_3$ as essentially the only sulfur compounds therein. A typical stack gas obtained by the combustion of a sulfur-containing fossil fuel contains the several gaseous components listed in Table I in the range of concentrations shown.

TABLE 1

| Component | Mol % | Component | ppmv |
|---|---|---|---|
| $O_2$ | 1–5 | CO | 0–500 |
| $CO_2$ | 10–20 | $NO_x$ | 10–2000 |
| $H_2O$ | 5–25 | $SO_2$ | 100–50,000 |
| $N_2$ | 70–75 | $SO_3$ | 0–200 |

The method of the invention will now be described in detail, with attention first being directed to removing $SO_x$ and then to removing $NO_x$.

$SO_x$ REMOVAL

Referring now to the drawing, the preferred embodiment of the invention will be described with relation to removing $SO_x$ components from a particulate-free stack gas containing $SO_2$ and $SO_3$ in concentrations falling in the typical ranges listed in Table I. The stack gas is fed by line 1 at a convenient temperature, usually less than about 200° F., and at a rate between about 1000 SCF/hr and about 100,000 SCF/hr and at a pressure slightly above atmospheric but preferably less than about 15 psig into absorber 2. The absorber may comprise such suitable gas-liquid absorption equipment as a packed tower, a multi-plate column, or a venturi scrubber, but the design should be such that sufficient contact time is provided for the $SO_x$ components to react as fully as possible with the fresh absorbent introduced through line 3 and make-up line 23. Preferably, the absorber is of a packed tower design, and the stack gas is passed countercurrently to the flow of the absorbent. An essentially $SO_x$-free and desulfurized product gas is thus discharged to the atmosphere by line 4 while spent absorbent containing dissolved $SO_x$ compounds is withdrawn via conduit 5.

The fresh absorbent fed into absorber 2 via lines 3 and 23 is an aqueous solution containing one or more water-soluble formate compounds, such as sodium formate, lithium formate, potassium formate, ammonium formate, or formic acid. The preferred aqueous absorbent comprises sodium formate, especially when buffered with formic acid to a pH in the 2.5–5.0 range.

Optionally, but not preferably, the fresh absorbent fed into the system via line 23 contains an alkaline agent in addition to the formate compound or compounds. The alkaline agent, if used, is preferably sodium hydroxide, but ammonium hydroxide or any water-soluble metal hydroxide, especially the alkali metal hydroxides, may be used, as also may such components as sodium carbonate, sodium bicarbonate, and other water-soluble salts of a strong base and a weak acid. For treating a typical stack gas of composition shown in Table I, the fresh absorbent added via line 3 typically contains 5–30 wt.% of sodium formate, 0–20 wt.% of additional alkaline agent, and sufficient formic acid to maintain the pH of the absorbent entering the absorber between about 2.5 and 10.0, and more preferably between 3.5 and 5.0. A preferred composition comprises 5 to 10 wt.% sodium formate and sufficient formic acid to maintain the pH of the fresh absorbent in line 3 in the 3.5–5.0 range. A still more preferred absorbent composition comprises 6.2 wt.% sodium formate and sufficient formic acid to buffer the composition at a pH of 4.0.

Although the invention is not intended to be limited to any particular theory of operation, it is believed that the chemical reaction in the absorber between the gaseous components in stack gas of composition shown in Table I and the components of the preferred aqueous absorbent containing no alkaline agent and having an acidic pH include the following:

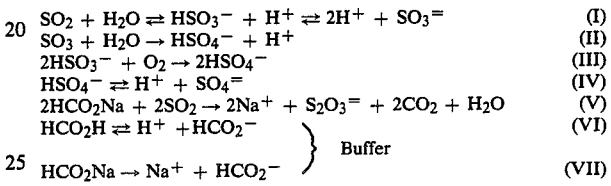

When the absorber is operated under preferred conditions, the flow rate of the absorbent fed via line 3 is so correlated with the amount of $SO_x$ removed from the stack gas that spent absorbent is withdrawn from absorber 2 via conduit 5 at a pH less than 7.0, preferably less than 5.0, thereby avoiding withdrawal of a solution rich in dissolved $CO_2$ from the stack gas. When the preferred absorbent containing no additional alkaline agent is utilized, the pH of the spent absorbent is withdrawn at a buffered pH between about 3.0 and 4.5, and more preferably still, between 3.5 and 4.3.

The spent absorbent in line 5 must be regenerated before being recycled to absorber 2 through line 3. However, in order to regenerate the spent absorbent in accordance with the invention, it is first heated to an elevated temperature, usually between about 240° and 350° F., and preferably between 270° and 290° F., and most preferably to a temperature of 285° F. Thus, the absorbent in line 5 is directed by pump 6 through pipe 7 to heat exchanger 8 wherein by indirect heat exchange with heated, regenerated absorbent the temperature of the spent absorbent is raised to about 150°–200° F. The absorbent is then introduced by conduit 9 into a second preheater 10, wherefrom heated absorbent is obtained in line 11 at a temperature of at least 240° F., preferably at a temperature of about 270° to 290° F. To the heated absorbent is added an aqueous solution containing a dissolved formate compound, such as dissolved formic acid, through line 13 and valve 14. The resulting mixture in pipe 12 is fed into regenerator 15.

In regenerator 15, the spent absorbent solution, now containing added formate ion from the formic acid, is regenerated back to its active form by contact at a pressure at least sufficient to prevent the absorbent from boiling and at a temperature of 240° to 350° F. with a water-insoluble, solid substance containing one or more tertiary amine (a valence state 3 nitrogen atom bonded only to carbon atoms) functional groups, with said functional groups preferably having anion exchange capacity and being ion exchanged to contain formate ion in at least some of the ion exchange sites. Preferably, a water-insoluble, anionic, organic, ion exchange resin containing tertiary amine functional groups, such as that marketed by Rohm & Haas Company under the trade name of Amberlyst A-21 is utilized. Although the exact composition of this resin is not available to the public, it is known that Amberlyst A-21 is a water-insoluble organic resin of macroreticular structure comprising a copolymer of a substituted styrene and divinylbenzene and containing weakly basic, tertiary amine functional groups, with essentially all of the anion exchange capacity residing in said tertiary amine functional groups. It is further known that Amberlyst A-21 is stable in regenerator 15 at the preferred operating temperature of 285° F., and that, when treated to contain formate ions at the ion exchange sites, it has catalytic activity for regenerating the spent absorbent to a form active for absorbing $SO_x$ compounds. Hence, when initially charged to regenerator 15, the Amberlyst A-21 resin particles are preferably ion-exchanged to contain the formate ion by pretreatment with hot formic acid under an inert or reducing atmosphere. In non-preferred embodiments, however, the resin may be pretreated by ion-exchange with a salt of formic acid, such as sodium formate, or the resin may simply be converted to the active form in situ, e.g., by adding sufficient formic acid via line 13 to activate the resin during regeneration. In all embodiments, however, it is preferred that formate ions occupy at least 50%, and preferably essentially all, of the anionic ion exchange sites.

In choosing a resin for use in regenerator 15, it is most highly preferred that the resin contain essentially no primary or secondary amines, especially if such primary or secondary amines contribute to the anion exchange capacity of the resin. It is believed that Amberlyst A-21 resin contains essentially no primary or secondary amines and that one of the reasons it is highly active for the chemical reactions required in regenerator 15 is that it is free or essentially free of primary and secondary amines. The number of quaternary amines in the resin should also be relatively low due to their strongly basic characteristics. Amberlyst A-21 has some quaternary amines but not enough to alter the weakly basic characteristics of the resin.

As an alternative to Amberlyst A-21 resin, it is a specific embodiment of the invention to utilize an organic resin comprising a copolymer of divinylbenzene, styrene, and a vinylpyridine, such as 2-vinylpyridine or 4-vinylpyridine, or a substituted vinylpyridine, such as 2-methyl-5-vinylpyridine. A method by which one such organic resin is prepared is by heating at 50° C. for one day a mixture composed of 75 parts by weight 2-methyl-5-vinylpyridine, 22 parts styrene, 3 parts divinylbenzene, 5 parts of a sodium fatty acid soap, 180 parts water (deionized), 0.3 parts by weight mixed tert-mercaptans, and 0.3 parts by weight potassium persulfate, following which the copolymer product is separated by conventional means from unreacted ingredients and dried. Another method is similar to the foregoing except that 75 parts of 4-vinylpyridine are utilized instead of 2-methyl-5-vinylpyridine and 0.3 parts of benzoyl peroxide is utilized in place of the potassium persulfate.

Although the invention is not limited to any particular theory of operation, it is believed that, when formic acid is the formate compound added via line 13, the chemical reactions resulting in the conversion of the absorbent solution back to its active form include the following ionic reactions:

$$2H^+ + SO_3^= + 3HCO_2H \rightarrow H_2S + 3CO_2 + 3H_2O \quad \text{(VIII)}$$

$$H^+ + HSO_3^- + 3HCO_2H \rightarrow H_2S + 3CO_2 + 3H_2O \quad \text{(IX)}$$

$$2H^+ + S_2O_3^= + 4HCO_2H \rightarrow 2H_2S + 4CO_2 + 3H_2O \quad \text{(X)}$$

It is also possible that some formic acid may be decomposed in regenerator 15 by reaction with dissolved oxygen as follows:

$$O_{2(aq)} + 2CO_2H \rightarrow 2CO_2 + 2H_2O \quad \text{(XI)}$$

Regeneration of the spent absorbent in regenerator 15 may be conveniently accomplished in a stirred reactor vessel wherein the absorbent and the organic resin are slurried for a time sufficient to convert a substantial proportion of the dissolved sulfur components to $H_2S$. Alternatively, the regeneration may be accomplished in a fixed bed reactor in which the spent absorbent must pass through a bed of Amberlyst A-21 resin (or other suitable resin) maintained to a depth of at least two feet, more preferably at least three feet, with the preferred ratio of bed depth to average bed diameter being 5:1. When a fixed bed reactor is used, the absorbent is passed through the bed of resin at a liquid hourly space velocity of at least 0.1, preferably at least 0.3, but no more than 10.0. The preferred operating conditions maintained in a fixed bed or stirred reactor are as follows: 285° F., 63 psia, 0.4 LHSV.

When preferred conditions are utilized in regenerator 15, the effluent in line 16 will be a two-phase fluid comprising a non-condensable gas phase and a liquid phase of regenerated absorbent. This effluent is directed to a gas-liquid separator 18, where the regenerated absorbent at a pH between about 2.5 and 10.0, preferably 3.5 to 5.0, is separated from the non-condensable gases and withdrawn through line 19. The non-condensable gases discharged through vent valve 17 contain a large proportion of $CO_2$, usually in a concentration of 60 to 90% by volume (dry basis), with the remainder of the gases comprising hydrogen, hydrogen sulfide, water vapor, nitrogen, and trace organosulfur gases. The non-condensable gases are preferably directed to sulfur recovery facilities (not shown in the drawing) wherein the $H_2S$ is converted to sulfur or $SO_2$, as by catalytically reacting the $H_2S$ with oxygen at a temperature above about 275° F., preferably about 350° F., in the presence of a catalyst comprising vanadium oxide or vanadium oxide plus bismuth oxide on silicaalumina (or other porous refractory oxide). More detailed disclosures relating to the catalytic conversion of $H_2S$ to sulfur or $SO_2$ may be found in U.S. Pat. No. 4,123,507, herein incorporated by reference.

The regenerated absorbent recovered in line 19 is directed by pump 20 and conduit 21 to heat exchanger 8 and thence to absorber 2 via lines 22 and 3. Eventually, steady state conditions will be attained, and the fresh absorbent feed from make-up line 23 is either shut-off or reduced as required by operating control valve 25. Line 24 and control valve 26 are provided to bleed absorbent from the system as required.

Under steady state conditions, the regeneration of the absorbent is controlled largely by the amount of formic acid added via line 13 and the temperature maintained in regenerator 15. Formic acid is preferably added at a rate at least sufficient to effect full conversion of dissolved $SO_2$ components (largely in the form of sulfite or bisulfite ion) to $H_2S$ according to:

$$3HCO_2H + SO_2 \rightarrow H_2S + 3CO_2 + 2H_2O \tag{XII}$$

Figure 2:
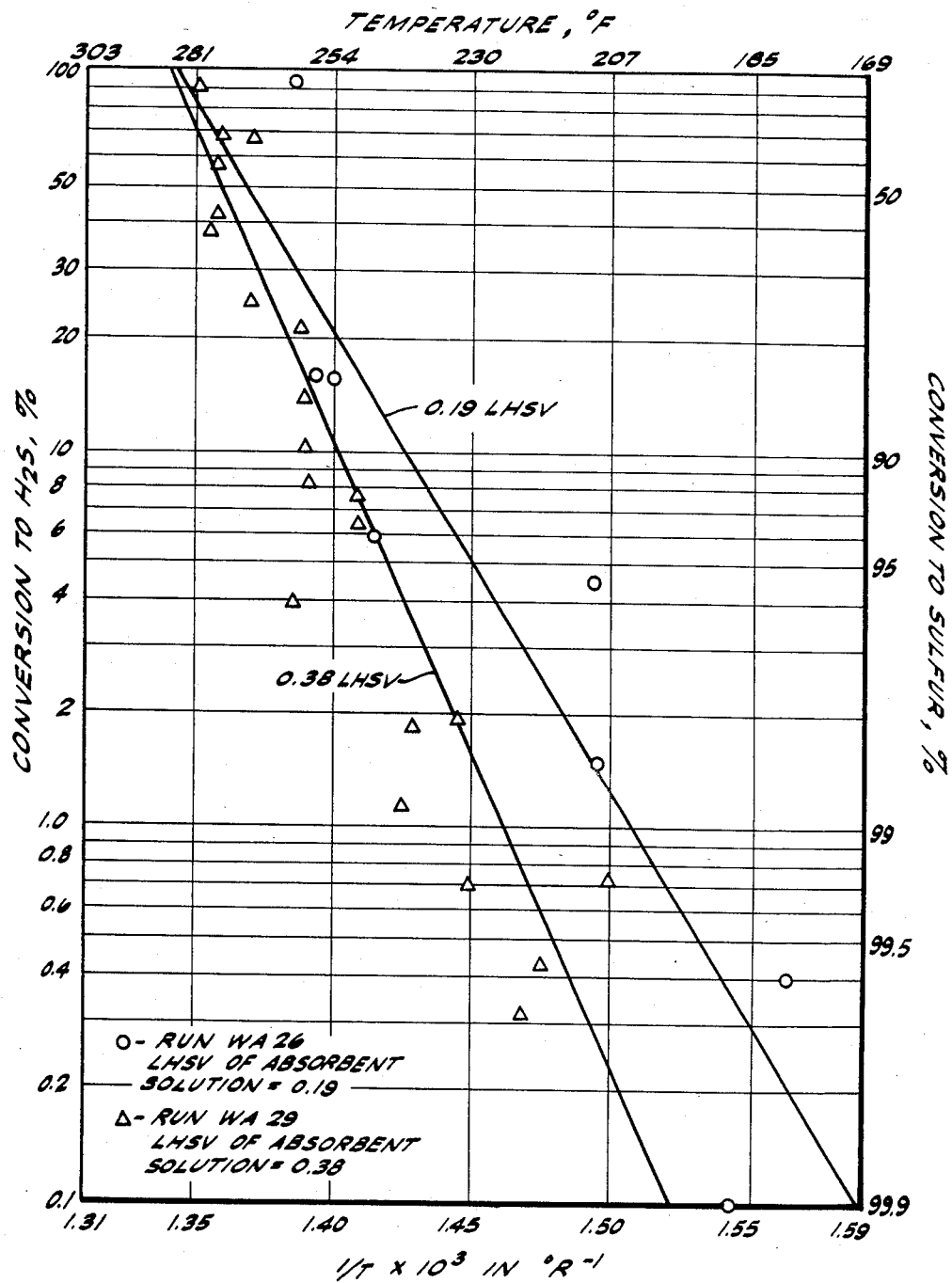
FIG. 2 of the drawing is a graphic representation of the relationship of the operating conditions during regeneration to the conversion of dissolved $SO_2$ in the absorbent to sulfur and hydrogen sulfide.

As the absorbent traverses the regeneration zone, its pH will increase with increasing conversions of dissolved $SO_2$ to $H_2S$. This conversion is maximized by controlling the temperature in regenerator 15. As shown in FIG. 2, the conversion of dissolved $SO_2$ to $H_2S$ increases dramatically in the temperature range of 260° to 300° F., approaching its maximum at temperatures above about 280° F.

It is noted with respect to the data in FIG. 2 that the dissolved $SO_2$ components may be converted to elemental sulfur. A process wherein dissolved $SO_2$ is converted to elemental sulfur in regenerator 15 is described in copending application Ser. No. 907,189, filed May 18, 1978, now U.S. Pat. No. 4,222,991 herein incorporated by reference. As the data in FIG. 2 show, the resin utilized in regenerator 15 catalyzes the conversion of dissolved $SO_2$ components to hydrogen sulfide and/or sulfur, depending upon the temperature maintained in the regenerator. Temperatures of about 205° to 250° F. result in large yields of elemental sulfur while temperatures of 280° to 300° F. result in large yields of hydrogen sulfide. Temperatures of 250° to 280° F. result in the conversion of dissolved $SO_2$ components to both hydrogen sulfide and sulfur, with the proportion of hydrogen sulfide increasing in the product gas with increasing temperature.

Under steady state conditions, the chemical composition of the regenerated absorbent in line 22 will contain not only the components originally added via make-up line 23, but also residual sulfur-containing anions, particularly sulfate anions. The concentration of these sulfur-containing anions will increase dramatically when conditions are maintained in regenerator 15 that do not result in high conversions of dissolved $SO_2$ to $H_2S$ or, less preferably, to sulfur or $H_2S$ plus sulfur. In particular, if the temperature chosen for the regenerator is so high that the resin begins to degrade, the regenerated absorbent in line 10 will gradually increase in concentration of sulfur-containing anions in direct relationship to the gradual loss of catalytic activity of the resin. Thus, for best results, and especially to maintain the make-up rate of fresh absorbent in line 23 and the bleed rate of spent absorbent in line 24 as low as possible, regenerator 15 should be operated under the conditions stated hereinbefore, and most specifically at a preferred temperature between about 280° F. and the temperature at which the particular resin begins to degrade.

Even under preferred conditions, however, some sulfur-containing anions, and particularly sulfate anions, will increase in concentration in the circulating absorbent. Although extremely high conversions (usually exceeding 95%) of dissolved sulfite, bisulfite, and thiosulfate ions to hydrogen sulfide have been found to take place in regenerator 15, it has also been found that sulfate ions prove exceptionally difficult to reduce in regenerator 15, and it is usually not possible to obtain high conversions of sulfate ion (formed either by the direct dissolution of $SO_3$ or by the reaction of dissolved $SO_2$ with dissolved oxygen) to hydrogen sulfide in regenerator 15. Thus, a bleed through line 24 will usually be necessary, not only to prevent exceeding the solubility limit of sulfate salts in the circulating absorbent but also to prevent the displacement of formate ions by sulfate ions from the resin in regenerator 15. It has, however, been found that a sulfate concentration as high as 10 g/l can be tolerated in the circulating absorbent without encountering difficulties.

The process as described is highly efficient when preferred conditions are utilized throughout. For a stack gas containing 2000 vppm $SO_2$, the desulfurized purified gas discharged via line 4 typically contains less than 200 vppm, usually less than 40 vppm, of $SO_2$. The desulfurized purified gas typically will carry, on a mass per hour basis, less than 10%, preferably less than 5%, of the amount of $SO_2$ carried in the stack gas. Also, in the preferred embodiment, the volumetric rate at which $H_2S$ is recovered from separator 18 will be at least 80%, usually at least about 90%, of the rate at which $SO_2$ is absorbed in absorber 2.

$NO_x$ REMOVAL

Because many stack gases and other waste gas streams contain $NO_x$ compounds in addition to $SO_x$ compounds, the invention is accordingly also directed to removing $NO_x$ from such gas streams. Although $NO_x$ is present in stack gases largely as NO, some stack gases may contain up to 5%, perhaps as much as 10%, of the $NO_x$ in the form of $NO_2$. $NO_2$ is readily absorbed in absorber 2 due to its high solubility in aqueous media. It is believed in the invention that, when the absorbent traversing absorber 2 contains dissolved sulfite ion, at least some $NO_2$ reacts in the absorber with sulfite ion to produce elemental nitrogen and sulfate ion. Some $NO_2$ dissolves directly into the absorbent as nitrate or nitrite ions, which are ultimately converted in regenerator 15 to nitrogen under the conditions hereinbefore specified. Nitrogen produced by reduction of nitrate and/or nitrite ions in regenerator 15 is recovered as a component of the product gas obtained through vent valve 17.

The removal of NO is more difficult than is the removal of $NO_2$, but it has been found that the absorbent, after the addition of iron(II) chelates thereto, becomes useful for absorbing NO. Thus, to remove NO and $SO_x$, the absorbent, in addition to containing a dissolved formate compound, also contains a water-soluble iron(II) chelate, such as Fe(II) EDTA (ferrous ion chelated by ethylenediaminetetraacetic acid) and Fe(II) HEDTA (ferrous ion chelated by N(hydroxyethyl)ethylenediaminetriacetic acid). Such chelates are usually present in the absorbent in a concentration between about 0.001 and 1.0 molar, perferably between about 0.1 and 0.25 molar. The chelate may be added to the absorbent solution in any of a variety of ways, with it being most preferred to add an alkali metal salt of EDTA or HEDTA and iron formate. If the iron formate is ferrous formate, the iron(II) chelate readily forms; if ferric formate, then ferric chelate forms, which is easily reduced to the necessary ferrous chelate by passage of the absorbent through regenerator 15.

When the absorbent passing through absorber 2 contains iron(II) chelate, it is highly effective for removing NO, most probably by the direct chemical reaction:

$$NO + Fe(II)EDTA \rightarrow NO \cdot Fe(II)EDTA \text{ (Adduct)} \tag{XIII}$$

In addition, however, some of the iron(II) chelate may react with oxygen, if present in the feed gas, to yield an iron(III) chelate, such as Fe(III)EDTA (ferric ion chelated by ethylenediaminetetraacetic acid). But in regenerator 15, under the conditions hereinbefore specified, the spent absorbent containing dissolved NO and any iron(III) chelate is regenerated to a form once again containing the active iron(II) chelate, most probably by the following chemical reactions:

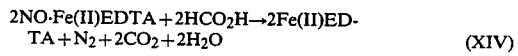
(XIV)

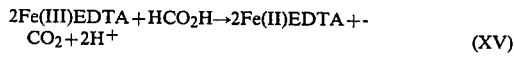
(XV)

The innocuous nitrogen produced in regenerator 15 from the dissolved NO is removed as a component of the product gas stream discharged through vent valve 17.

Thus, in this embodiment of the invention, a single absorbent is utilized to remove both $SO_x$ and $NO_x$ components, and the spent absorbent is regenerated by contact in the presence of added formate ion with a tertiary amine-containing substance as described hereinbefore. One of the highly beneficial features of the invention, therefore, when both $SO_x$ and NO components must be removed, is that an aqueous absorbent comprising a formate compound and an iron(II) chelate is useful for simultaneously removing both $SO_x$ and NO in an absorption zone and, when spent, is capable of being regenerated in a single regeneration zone.

Another highly beneficial feature of the invention when $NO_x$ removal is desired is that any iron(III) chelate formed in the absorber by reaction with oxygen and any iron(III) chelate deliberately added to the absorbent are converted to iron(II) chelate in regenerator 15 so as to insure the continuous removal of NO from the feed gas. Iron(III) chelate is not active for removing NO, and accordingly, when NO is to be removed, iron(III) chelate must be reduced to iron(II) chelate in regenerator 15. A highly convenient visual method for determining if the regenerated absorbent is sufficiently regenerated for purposes of NO absorption is by the color of the regenerated absorbent. Since iron(II) chelates are almost colorless, while most iron(III) chelates exhibit noticeable color, usually a brownish-red color in acidic media, the regenerated absorbent from separator 18 recovered in line 19 must either be almost colorless or exhibit a lighter color than the spent absorbent in line 5. Most usually, the regenerated absorbent will evince some color, usually a pale amber color, since the conversion of ferric chelate to ferrous chelate is usually not 100% complete. Thus, the preferred method of operation with iron-chelate-containing absorbents converts a spent absorbent of a relatively dark color to a regenerated absorbent exhibiting only a tinge of color, and the difference in color of the two liquids provides a quick indication that the regenerated absorbent is active for absorbing NO.

When the process of the invention is utilized to treat a stack gas having essentially all of its $NO_x$ in the form of NO, the $NO_x$ removal is such that the purified gas removed from absorber 2 carries, on a mass per hour basis, less than 15% of the amount of $NO_x$ carried in the stack gas. Essentially all $NO_x$ absorbed in the absorbent solution is converted in regenerator 15 to nitrogen and recovered with the product gas. No significant concentrations of ammonium ion, for example, have ever been discovered to be present in the absorbent leaving the regenerator. Thus, the concentration of nitrogen components in the circulating absorbent does not increase in the manner of sulfate ion as hereinbefore described.

In view of the foregoing, it should be apparent that the invention may easily be modified so as to be useful for removing NO from a feed gas containing NO but no $SO_x$ compounds, e.g., a stack gas produced from burning sulfur-free natural gas as fuel. In this modification, it is only necessary to provide a regenerated absorbent in line 3 containing sufficient of an iron(II) chelate to remove the NO in the feed gas. Spent absorbent is then regenerated in regenerator 15 with sufficient added formate ion from a source such as formic acid added through line 14. Regeneration in regenerator 15 is accomplished, for example, by contact with formate ion-exchanged Amberlyst A-21 resin in a manner as hereinbefore described for removing either $SO_x$ alone or $SO_x$ plus $NO_x$ compounds.

The following Examples are provided to illustrate the preferred embodiments of the invention and to provide data relating to the performance of the catalyst for reducing dissolved $SO_x$ and $NO_x$ components in regenerator 15. The Examples are not provided to limit the invention, the scope of which is defined by the claims.

EXAMPLE I

A simulated stack gas stream having the composition shown in Table II was passed at a pressure slightly greater than atmospheric into a laboratory-sized absorber having a height of 3 feet and containing ¼ inch ceramic Berl saddles at the rate of 1000 scc/min (scc referring herein to the calculated volumetric gas rate at 1 atm. and 60° F.). The absorber was operated at a temperature of about 130° F., and the simulated stack gas was passed upwardly in countercurrent flow with an aqueous liquid absorbent. The absorbent initially had a pH of 4.0 and comprised monohydrated ferric formate $(Fe(CO_2H)_3 \cdot H_2O)$ in a 0.18 molar concentration, sodium HEDTA in a 0.32 molar concentration, sodium formate in a 1.0 molar concentration, and formic acid in a 1.0 molar concentration.

Spent absorbent recovered from the absorber was passed upwardly through a regenerator comprising a stirred reactor containing 200 grams of Amberlyst A-21 weakly basic anion exchange resin (53 wt.% moisture). The resin had been ion-exchanged to contain formate ions at the ion exchange sites by first immersing the resin in an aqueous solution comprising 90 wt.% formic acid and then heating the resulting slurry to 208° F. in a nitrogen atmosphere for one hour. After the slurry was separated into solid particles of resin and an acidic liquid, the resin was washed three times with distilled water and charged to the reactor.

The volume of the reactor not occupied by the resin was approximately 2.0 liters. The operating conditions maintained in the regenerator were 285° F. and 63 psia. Concentrated formic acid (98 wt.%) was continually added to the regenerator at a rate of 2.12 ml/hr. The space velocity of liquid passing through the regenerator vessel, based on the volume of moist resin, was 0.38 LHSV.

A fluid mixture of gas and regenerated absorbent was produced in the regenerator and passed to a suitable gas-liquid separator. A product gas was recovered from the gas liquid separator at a rate of 37.25 scc/min while regenerated absorbent was recovered and recycled at a rate of 110 ml/hr to the absorber. Water was added as necessary to the recycled absorbent to maintain a liquid circulation rate of 110 ml/hr.

After operating in the foregoing manner for approximately one week (by which time steady state conditions were obtained), a sample of the purified gas recovered from the absorber at a rate of 997.8 scc/min was analyzed, and the results are shown in Table II. Approximately 99% of the $SO_2$ and approximately 89% of the NO in the stack gas feed were removed. In addition, samples of the absorbent solution were analyzed, and it was found that the absorbent had a pH of about 4.2 as it entered the absorber and about 3.8 when it left. The steady state sulfite concentration of the absorbent entering the regenerator was 3.33 g/l (calculated as $SO_3^{-2}$) and less than 0.1 g/l while leaving. Samples of the absorbent solution taken at various times throughout the week were subjected to analysis for sulfate concentration. The analysis showed that the sulfate concentration increased at a substantially steady rate of 0.26 g/l/day (calculated as $SO_4^{-2}$).

A sample of the product gas stream recovered from the gas-liquid separator was chemically analyzed and found to contain the components shown in Table II in the concentrations therein shown. These data indicate much higher than expected recoveries of $CO_2$ and $H_2$ from the gas-liquid separator. It was therefore determined that much of the formic acid introduced into the regenerator was decomposing therein and forming $H_2$ and $CO_2$. Accordingly, the formic acid feed rate of 2.12 ml/hr was far in excess of that required in the process, a rate of 0.82 in l/hr being more appropriate. However, the fact that $H_2S$ was present in the product gas stream in a concentration of 4.78% is highly significant. From the data in Table II and the volumetric gas rates set forth hereinbefore, it was determined that $SO_2$ was absorbed in the absorbent at a rate of 1.98 scc/min and recovered as $H_2S$ at a rate of 1.782 scc/min, with the difference largely accumulating in the absorbent in the form of sulfate. Thus the process proved highly efficient for the removal of $SO_2$ from a gas stream and conversion to $H_2S$. Similarly, since no nitrogen oxides were found in the product gas recovered from the gas-liquid separator, the process was shown to be highly effective for the removal of NO and conversion to an innocuous form.

TABLE II
GAS STREAM COMPOSITIONS

| Gas Component | Simulated Stack Gas | Purified Gas | Product Gas |
|---|---|---|---|
| $SO_2$, vppm | 2000 | 20 | 21 |
| NO, vppm | 500 | 55.1 | — |
| $O_2$, vol. % | 3.4 | 3.41 | — |
| $CO_2$, vol. % | 14.0 | 13.93 | 57.75 |
| $N_2$, vol. % | 82.35 | 82.65 | 0.36 |
| $H_2S$, vol. % | — | — | 4.78 |
| $H_2$, vol. % | — | — | 37.06 |
| $CH_3SH$, vppm | — | — | 450 |
| COS, vppm | — | — | 29 |

EXAMPLE II

A series of experiments were run in a manner similar to that described in Example I to determine the efficiency of the conversion of dissolved $SO_2$ components entering the regenerator as a function of operating temperature and space velocity. The main differences in these experiments that contrast with the Example I experiment are as follows: (1) several runs were performed utilizing a space velocity of absorbent passing through the regenerator of 0.19 LHSV as well as the 0.38 LHSV of Example I, (2) operating temperatures were varied in the range of about 200° to 290° F., (3) the feed gas to the absorber contained no $NO_x$ components and therefore no iron chelates were present in the absorbent solution, and (4) the absorbent solution consisted essentially of a 1.0 molar solution of sodium formate buffered to a pH in the range of 4.0 to 4.7 with formic acid. The data collected from the experiment is presented in the semi-log plot shown in FIG. 2. These data establish that high conversions to $H_2S$ of dissolved $SO_2$ in the absorbent are obtained at temperatures above about 260° F. while significant conversions are obtained at temperatures as low as about 240° F.

Although the invention has been described in conjunction with specific embodiments and examples thereof, it is evident that many alternatives, modifications, and variations will be apparent to those skilled in the art in light of the foregoing description. For example, many reducible sulfoxy anions besides those shown hereinbefore may be converted to hydrogen sulfide under the conditions maintained in regenerator 15. For example, polythionates may be converted according to a chemical reaction such as:

$$S_2O_6^= + 8HCO_2H \rightarrow 2H_2S + 8CO_2 + 6H_2O \qquad (XVI)$$

A specifically contemplated aqueous solution which may be treated under the conditions of regenerator 15 is Wackenroder's solution, an aqueous solution found during an aqueous Claus reaction. Accordingly, it is intended to embrace this and all such alternatives, modifications, and variations as fall within the spirit and scope of the appended claims.

I claim:

1. A process for treating a feed aqueous solution containing a ferric chelate, which process comprises (1) contacting in the presence of formate ion, said feed aqueous solution with a water-insoluble, solid substance containing a tertiary amine functional group under conditions, including an elevated temperature, such that a substantial proportion of said ferric chelate is converted to the corresponding ferrous chelate, and (B 2) recovering a product aqueous solution containing an increased content of ferrous chelate in comparison to said feed aqueous solution.

2. A process as defined in claim 1 wherein said ferric chelate is selected from the group consisting of iron(III) EDTA and iron(III) HEDTA.

3. A process as defined in claim 2 wherein said feed aqueous solution is acidic and has a red-brown color while said product aqueous solution has only a tinge of color.

4. A process as defined in claim 1 wherein said solid substance is a catalyst comprising a water-insoluble, organic ion exchange resin containing tertiary amine functional groups, said resin comprising a copolymer of styrene or a substituted styrene, divinylbenzene, and a resin component selected from the group consisting of the vinylpyridines and the substituted vinylpyridines, said resin having anionic ion exchange capacity, essentially all of which exchange capacity resides in said tertiary amine functional groups, and said resin further containing formate ion in at least 50 percent of the anionic ion exchange sites.

5. A process as defined in claim 2 wherein said solid substance is a catalyst comprising a water-insoluble, organic ion exchange resin containing tertiary amine functional groups but essentially no primary or secondary amine functional groups, said resin comprising a copolymer of styrene or substituted styrene, divinylbenzene, and a resin component selected from the group consisting of the vinylpyridines and the substituted vinylpyridines, said resin having anionic ion exchange capacity and containing formate ion in at least 50 percent of the anionic ion exchange sites.

6. A process as defined in claim 4 or 5 wherein said resin component is 4-vinylpyridine.

7. A process as defined in claim 4 or 5 wherein said resin component is 2-methyl-5-vinylpyridine.

8. A process as defined in claim 4 or 5 wherein said resin is of macroreticular structure.

9. A process as defined in claim 4 or 5 wherein essentially all of said anionic ion exchange capacity is satisfied with formate ions.

10. A process as defined in claim 6 wherein essentially all of said anionic ion exchange capacity is satisfied with formate ions.

11. A process as defined in claim 7 wherein essentially all of said anionic ion exchange capacity is satisfied with formate ions.

12. A process as defined in claim 2 wherein said solid substance is a catalyst consisting essentially of a water-insoluble, organic ion exchange resin containing tertiary amine functional groups, said resin comprising a copolymer of styrene or a substituted styrene, divinylbenzene, and a resin component selected from the group consisting of the vinylpyridines and the substituted vinylpyridines, said resin having anionic ion exchange capacity, essentially all of which exchange capacity resides in said tertiary amine functional groups, and said resin further containing formate ion in at least 50 percent of the anionic ion exchange sites.

13. A process as defined in claim 1 wherein said solid substance is a catalyst consisting essentially of a water-insoluble, organic ion exchange resin containing tertiary amine functional groups but essentially no primary or secondary amine functional groups, said resin comprising a copolymer of styrene or substituted styrene, divinylbenzene, and a resin component selected from the group consisting of the vinylpyridines and the substituted vinylpyridines, said resin having anionic ion exchange capacity and containing formate ion in at least 50 percent of the anionic ion exchange sites.

14. A process as defined in claim 12 wherein said resin component is 4-vinylpyridine.

15. A process as defined in claim 13 wherein said resin component is 2-methyl-5-vinylpyridine.

16. A process as defined in claim 13, 14, or 15 wherein essentially all of said anionic ion exchange capacity is satisfied with formate ions.

17. A process as defined in claim 1, 2, 3, 4, 5, 12, 13, 14, or 15 wherein said solid substance is relatively free of quaternary amines.

18. A process as defined in claim 17 wherein said anionic ion exchange capacity is essentially completely satisfied with formate ions.

19. A process as defined in claim 1, 2, 3, 5, 12, or 13 wherein said catalyst has been prepared by a method comprising the step of reacting, in an aqueous medium, divinylbenzene, styrene or a substituted styrene, a vinylpyridine or a substituted vinylpyridine, a fatty acid soap, a tert-mercaptan, and a compound selected from the group consisting of potassium persulfate or benzoyl peroxide and contacting the reaction product of said reacting with a source of formate ion.

20. A process as defined in claim 19 wherein said solid substance is relatively free of quaternary amines.

21. A process as defined in claim 20 wherein said anionic ion exchange capacity is essentially completely satisfied with formate ions.

22. A process as defined in claim 1, 2, 3, 4, 5, or 12 wherein said catalyst has been prepared by a method comprising the step of reacting, in an aqueous medium, divinylbenzene, styrene, 4-vinylpyridine, a fatty acid soap, a tert-mercaptan, and benzoyl peroxide and contacting the reaction product of said reacting with a source of formate ion.

23. A process as defined in claim 1, 2, 3, 4, 5, or 13 wherein said catalyst has been prepared by a method comprising the step of reacting, in an aqueous medium, divinylbenzene, styrene, 2-methyl-5-vinylpyridine, a fatty acid soap, a tert-mercaptan, and potassium persulfate and contacting the reaction product of said reacting with a source of formate ion.

* * * * *